Sept. 7, 1965   J. W. HUGHES   3,204,335
PAPER CARTON CUTTER
Filed Aug. 16, 1963
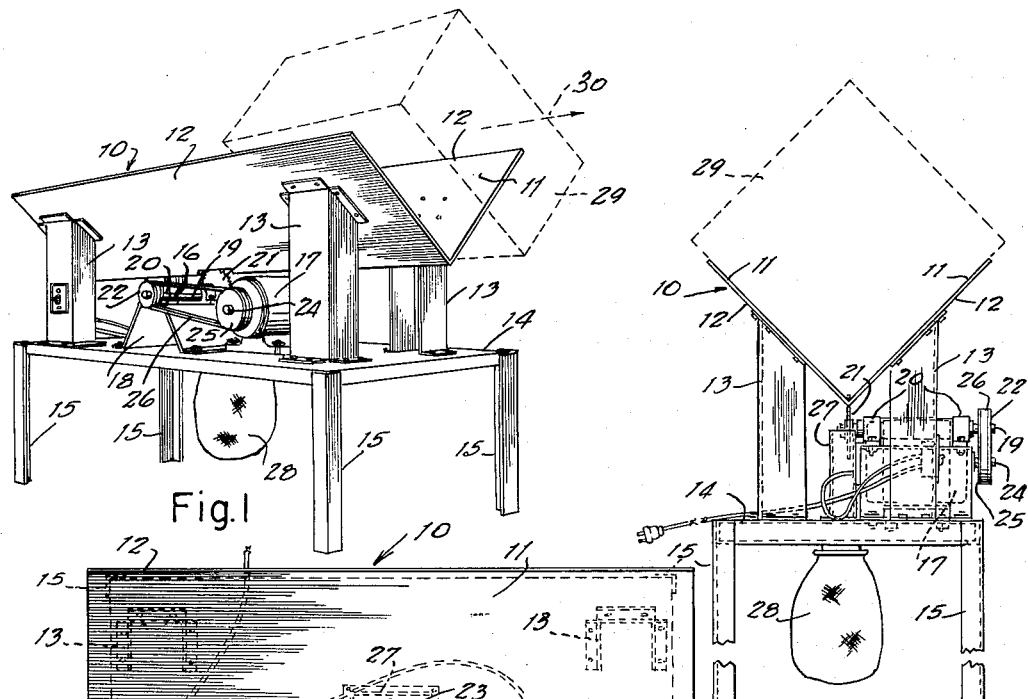
Fig.1
Fig. 2
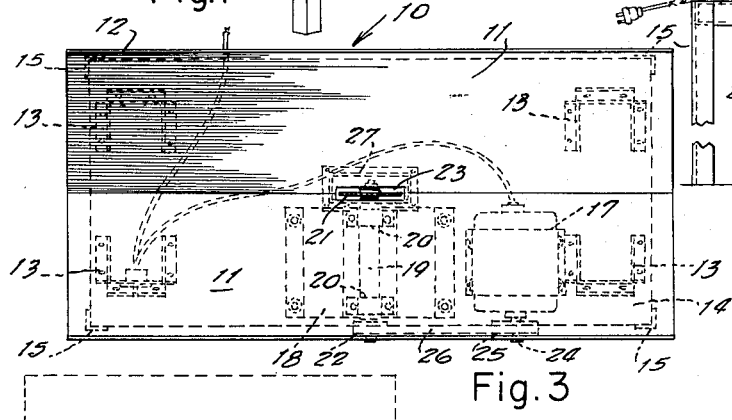
Fig.3
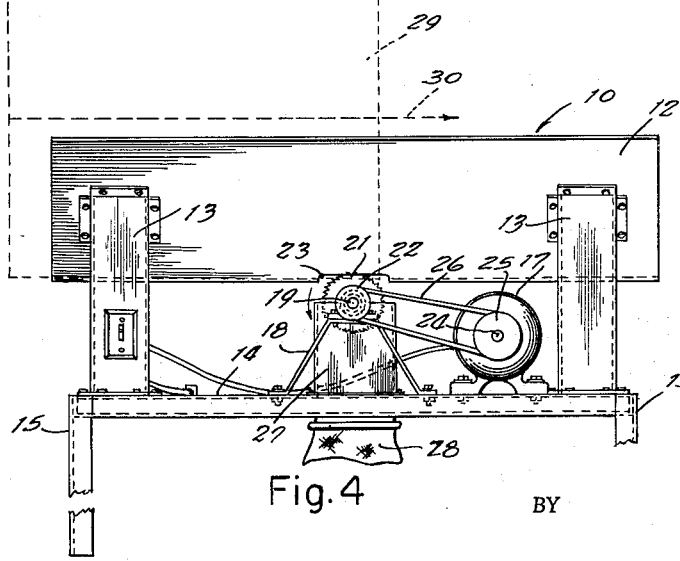
Fig.4
INVENTOR
John W. Hughes
BY
ATTORNEY 3,204,335
PAPER CARTON CUTTER
John W. Hughes, 920 S. Lamar St., Dallas, Tex.
Filed Aug. 16, 1963, Ser. No. 302,603
1 Claim. (Cl. 30—2)

This invention relates to apparatus for cutting up empty cardboard or fiber cartons whereby such containers, when their purpose is served, can be flattened and disposed of as waste paper.

The disposition of empty packaging materials, such as cardboard or fiber-board cartons, has presented a variety of problems to merchants, shippers, and other industries, since a major portion of all merchandise and commodities manufactured for the consuming public are packaged in some type of disposable carton, substantially varying in size, which must be reduced to a compact form for storage and final disposition.

Substantially all of such materials, being of a fibrous character, can be treated as waste paper and returned to the paper mills to be reduced to pulp in the production of paper stock, but the bulky cartons must be minimized to conserve space, time and labor in their handling and transportation.

A prime object of the invention resides in the provision of a compact and inexpensive mechanism for cutting the cartons along one or more of their corners whereby they can be flattened and stacked enabling them to be bound in bales, if desired, and economically stored and transported.

The invention is simple in construction, and while the foregoing objects are paramount, other and lesser objects will become apparent as the description proceeds when considered with the appended drawings wherein:

FIGURE 1 is a perspective illustration of the invention showing the angular table, and showing in broken lines, an empty carton operatively arranged thereon.

FIGURE 2 is an end elevational view of the invention, also showing, in broken lines, a carton arranged on the angular table, and showing a dust collector bag therebeneath.

FIGURE 3 is a plan view of the invention, the motor, saw arbor and base being shown in broken lines, and FIGURE 4 is a side elevational view of the invention showing the saw and motor beneath the angular table, and showing a carton in broken lines arranged thereon, the base being fragmentarily shown.

The invention primarily comprises a work table 10 which has opposing angular surfaces 11 defined by a pair of inclined plates 12 right angularly joined along their lower edges to form a V-shaped trough supported by legs 13 which, in turn, are supported on a base 14 which has legs 15 at each corner thereof.

The angular work table 10 is spaced above the base 14 on which is mounted a saw arbor 16 and a motor 17. The arbor 16 is supported on a bracket 18 whose leg portions are bolted to the base 14, as shown best in FIGURES 1 and 4. The arbor 16 is comprised of a shaft 19 journalled in bearings 20 arranged at each end of the bracket 18, a circular saw blade 21 being attached to one end of the shaft 19 and a V-pulley 22 on its opposite end.

The saw blade 21 is arranged centrally of the base 14 and intermediate the ends of the angular table 10, projecting into a slot 23 in the bottom of the table 10, as shown in FIGURE 3, and is driven by the motor 17 on whose shaft 24 is arranged a V-pulley 25 having a V-belt 26 thereon encompassing the pulley 22 on the saw shaft 19.

The saw blade 21 is arranged over a well or chute 27 rising from the base 14 and depending therebelow providing for the entrapment and disposal of the cuttings from the blade 21 which drop into a collector bag 28 attached to the lower end of the chute 27 and depending below the base 14, as shown in FIGURES 1, 2 and 4. The bag 28 is detachable for convenient disposal of the saw cuttings collected therein. Obviously, however, such cuttings may be disposed of through the use of any suitable type of duct system wherein a fan may be arranged so that the dust can be discharged into a remotely situated container or into the atmosphere.

The arrangement and angular form of the table 10 is functionally adapted to the cutting of rectangular cartons 29, shown in broken lines in FIGURES 1, 2 and 4, of varying sizes and dimensions, providing simple means by which the empty containers can be conformably arranged in the V-shaped trough-like table 10 so that, when moved therealong in the direction indicated by arrows 30, shown in dotted lines in FIGURES 1 and 4, the cartons 29 can be cut along a corner thereof and transformed into a single flat sheet. If desirable, of course, the carton can be cut along more than one of its corners.

The invention, while illustrated and described in substantial detail, is obviously capable of certain changes in structure and design without departing from the spirit and intent thereof or from the scope of the appended claim.

What is claimed is:

In a device for cutting cardboard cartons for disposal, comprising, in combination with a base, and an angular work table supported on and spaced above said base, the said table comprising right-angularly disposed plates integrally joined along their lower edges defining a V-shape in transverse section, an elongated slot formed longitudinally of said table intermediate its ends at the juncture of the angular plates, a circular saw arranged on said base below said table and operatively extending upwardly through said slot between said angular plates, and a motor for operating said circular saw.

References Cited by the Examiner
UNITED STATES PATENTS

| 403,880 | 5/89 | Farwell. | |
|---|---|---|---|
| 718,882 | 1/03 | Savaria | 30—2 |
| 2,256,630 | 9/41 | Shield | 30—2 |
| 2,684,088 | 7/54 | Miller | 143—38 |

WILLIAM FELDMAN, *Primary Examiner.*

MILTON S. MEHR, *Examiner.*